(12) United States Patent
Couasnon et al.

(10) Patent No.: US 8,678,336 B2
(45) Date of Patent: Mar. 25, 2014

(54) VEHICLE SEAT RUNNER AND SEAT COMPRISING SUCH A RUNNER

(75) Inventors: Christian Couasnon, Flers (FR); Emmanuel Levert, Donville les Bains (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 13/078,481

(22) Filed: Apr. 1, 2011

(65) Prior Publication Data
US 2011/0240821 A1 Oct. 6, 2011

(30) Foreign Application Priority Data
Apr. 2, 2010 (FR) ...................................... 10 52540

(51) Int. Cl.
B60N 2/06 (2006.01)
(52) U.S. Cl.
USPC ..................... 248/429; 296/65.13; 297/344.11
(58) Field of Classification Search
USPC ............... 248/429, 424, 419, 420; 296/65.13, 296/65.14, 65.15; 297/344.1, 463.1, 341, 297/378, 12, 378.14, 378.12, 344.11
See application file for complete search history.

(56) References Cited

U.S. PATENT DOCUMENTS

| | | | |
|---|---|---|---|
| 5,676,341 A * | 10/1997 | Tarusawa et al. ............. | 248/430 |
| 6,364,272 B1 * | 4/2002 | Schuler et al. ................ | 248/424 |
| 6,641,104 B2 * | 11/2003 | Flick ............................. | 248/430 |
| 6,767,029 B2 * | 7/2004 | Jaudouin et al. ............. | 280/735 |
| 6,981,681 B2 * | 1/2006 | Matsumoto ................... | 248/424 |
| 7,066,521 B2 * | 6/2006 | Jung et al. .................... | 296/65.13 |
| 7,506,856 B2 * | 3/2009 | Ikegaya et al. ............... | 248/430 |
| 7,604,214 B2 * | 10/2009 | Kojima et al. ................ | 248/430 |
| 7,780,138 B1 * | 8/2010 | Lee et al. ...................... | 248/429 |
| 7,837,145 B2 * | 11/2010 | Wodak ......................... | 244/118.6 |
| 7,850,137 B2 * | 12/2010 | Abdella et al. ............... | 248/429 |
| 8,033,520 B2 * | 10/2011 | Fujieda et al. ................ | 248/430 |
| 8,191,850 B2 * | 6/2012 | Wetzig et al. ................ | 248/429 |
| 8,282,151 B2 * | 10/2012 | Kojima et al. ............... | 296/65.13 |
| 2002/0060281 A1 * | 5/2002 | Okazaki et al. .............. | 248/424 |
| 2002/0079418 A1 * | 6/2002 | Tame et al. ................... | 248/429 |

(Continued)

FOREIGN PATENT DOCUMENTS

| DE | 43 04 456 | 8/1993 |
|---|---|---|
| DE | 202009002972 U1 * | 7/2009 |

(Continued)

OTHER PUBLICATIONS

French Search Report from priority French application No. FR 10 52540; Report dated Nov. 19, 2010.

*Primary Examiner* — Jonathan Liu
*Assistant Examiner* — Guang H Guan
(74) *Attorney, Agent, or Firm* — Miller, Matthias & Hull LLP

(57) ABSTRACT

The vehicle seat runner comprising first and second profiles sliding inside each other and a stop fixed on the first profile to limit the travel of the second profile. The stop passes through a first opening in the first profile and has, inside the runner, a stop face oriented capable of stopping the second profile and a nose opposite the stop face and that rests against an inner face of the first profile. The stop is extended opposite the nose, by a shank that extends against an outer face of the first profile to a fixing lug clipped into a second opening in the first profile.

12 Claims, 12 Drawing Sheets

(56) References Cited

U.S. PATENT DOCUMENTS

| | | | |
|---|---|---|---|
| 2007/0069098 A1* | 3/2007 | Kojima | 248/429 |
| 2008/0048087 A1* | 2/2008 | Kojima et al. | 248/430 |
| 2009/0134681 A1* | 5/2009 | Quast et al. | 297/341 |
| 2010/0090084 A1* | 4/2010 | Moriyama et al. | 248/430 |
| 2011/0233365 A1* | 9/2011 | Kato et al. | 248/429 |
| 2012/0001049 A1* | 1/2012 | Selbold et al. | 248/429 |

FOREIGN PATENT DOCUMENTS

| | | | |
|---|---|---|---|
| DE | 10 2008 012213 | 9/2009 | |
| DE | 102008012213 A1 * | 9/2009 | |
| EP | 1 974 985 | 10/2008 | |
| FR | 2 847 530 | 5/2004 | |
| WO | WO 2009022214 A1 * | 2/2009 | B60N 2/07 |
| WO | WO 2009/109316 | 9/2009 | |

* cited by examiner

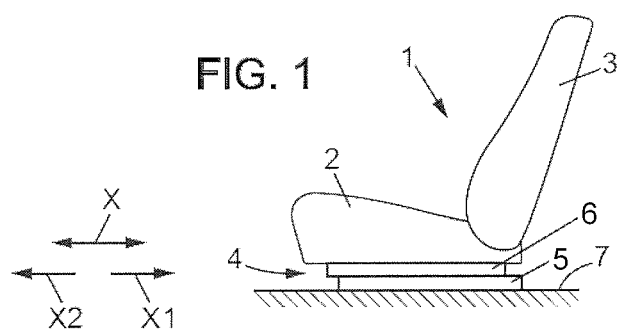
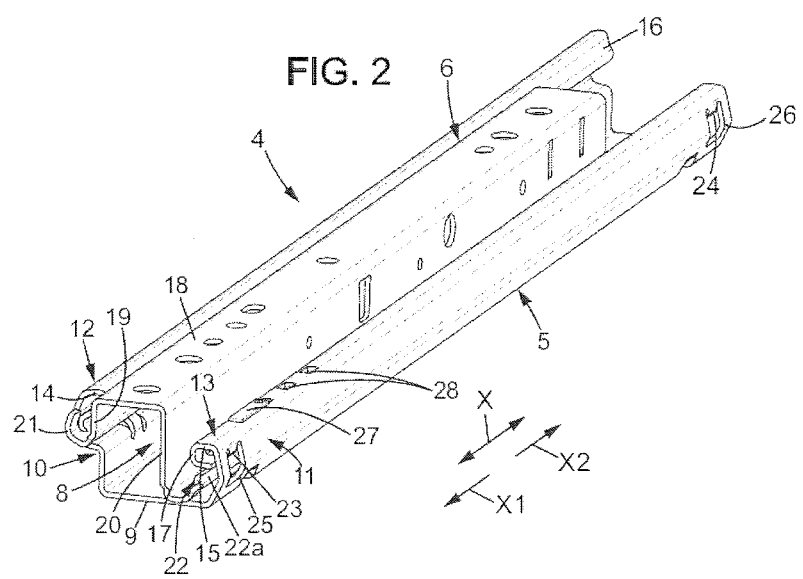

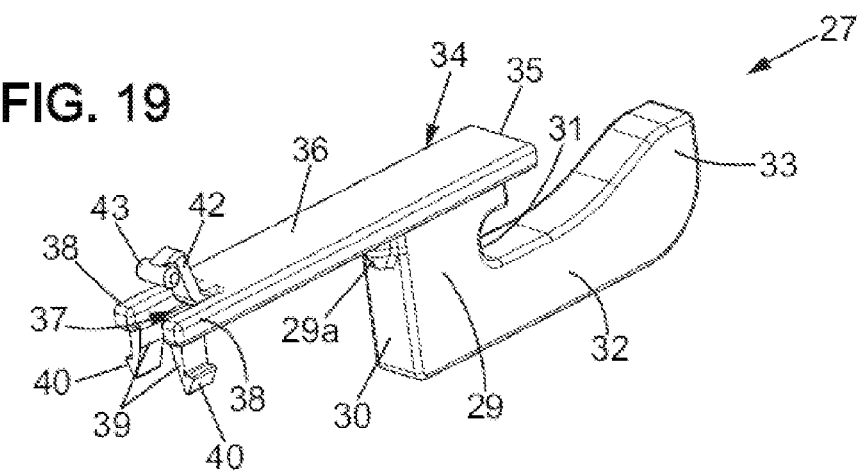
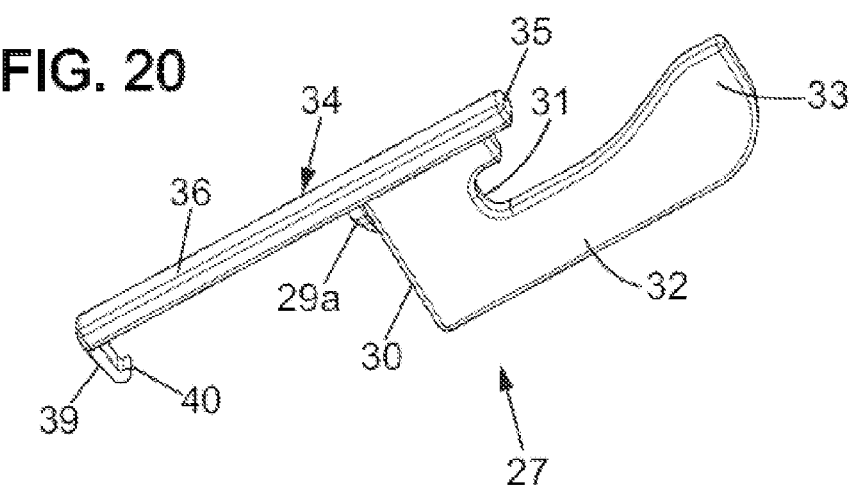

VEHICLE SEAT RUNNER AND SEAT COMPRISING SUCH A RUNNER

CROSS-REFERENCE TO RELATED APPLICATIONS

This application claims priority under the Paris Convention to the French Patent Application No. 10 52540, filed on Apr. 2, 2010.

FIELD OF THE DISCLOSURE

The present invention relates to vehicle seat runners and seats comprising such runners.

More particularly, the invention relates to a vehicle seat runner comprising:
first and second profiles mounted sliding relative to each other in a longitudinal direction, in opposite first and second directions, said first and second profiles being fitted inside each other, delimiting an inner space, the first profile of the runner comprising a fixing wall that has a series of openings aligned in the longitudinal direction, said fixing wall having an inner face oriented towards the inner space of the runner and an opposite outer face,
a stop comprising a stop body that is arranged in the inner space of the runner and has a stop face capable of abutting against the second profile, thus limiting a relative sliding between the first and second profiles in the first direction,
said stop body being extended within the inner space of the runner, in the first direction, by a nose that is arranged to rest against the inner face of the fixing wall,
said stop body passing through the first opening in the fixing wall and being extended, outside the runner, by a shank that extends in the second direction and rests against the outer face of the fixing wall.

BACKGROUND OF THE DISCLOSURE

Document DE-A-10 2008 012213 describes an example of such a runner, in which the stop is mounted on the fixing wall by means of a positioning element situated in the inner space of the runner. The necessary presence of this positioning element complicates the structure and the installation of the stop assembly constituted by the stop and said positioning element. In addition, installation through the inside of the runner also complicates the installation procedure.

OBJECTS AND SUMMARY OF THE DISCLOSURE

A purpose of the present invention is in particular to overcome these drawbacks.

To this end, according to the invention, a runner of the type in question is characterized in that the shank of the stop comprises at least one fixing lug that enters the second opening in the fixing wall and rests under the inner face of said fixing wall.

As a result of these arrangements, the stop is firmly fixed to the fixing wall of the first profile, without the need for an additional positioning element. In addition, the stop can be fixed from outside the runner by engaging the nose in the first opening then folding the shank of the stop down against the outer face of the fixing wall and engaging the fixing lug in the second opening, which simplifies the operation of installing the stop.

In different embodiments of the runner according to the invention, it is moreover possible, optionally, to make use of one and/or another of the following arrangements:
the fixing lug is flexible and ends in a hook clipped under the fixing wall;
the shank of the stop comprises two flexible fixing lugs ending in hooks oriented in opposite directions to each other transversally relative to the longitudinal direction, said hooks being clipped under the fixing wall;
the shank of the stop comprises moreover a lug that can be folded down by plastic deformation between the two flexible lugs, said folding lug being capable, when folded down, of preventing the flexible lugs from moving towards each other: the folding lug then prevents the hooks on the flexible lugs from unclipping;
the hook on said flexible lug is oriented longitudinally, in the first direction;
the first opening is delimited in the longitudinal direction by a front edge in the first direction and by a rear edge in the second direction, and the stop body rests against said front edge: this arrangement allows for a particularly firm and long-lasting fixing of the stop, as it makes it possible to absorb the stop forces by making the stop body work in shear between said front edge and the second profile of the runner;
the stop has a front rim that extends in the first direction against the outer face of the fixing wall beyond the front edge of the first opening: this arrangement also reinforces the fixing of the stop;
the stop body is shaped in order to be able to be fitted inside the first opening by engagement of the nose in said first opening then folding down of the shank of the stop against the outer face of the fixing wall, without interference between said stop body and the rear edge of the first opening;
the first opening and the stop body are shaped so that said stop body can only be fitted inside said first opening with the stop face oriented in the second direction;
the first profile has a substantially U-shaped cross section comprising a base and two lateral wings extended by two webs that extend inwards and towards the base, the second profile is fitted inside the first profile and has a substantially U-shaped cross section with a cover wall substantially parallel to the base and two lateral wings extending towards the base and extended outwards and opposite the base, by two flanges entering the webs of the first profile, and said stop face being capable of abutting against a stop edge belonging to one of the flanges of the second profile;
the fixing wall belongs to the lateral wing of the first profile, corresponding to said stop edge;
the fixing wall belongs to the web corresponding to said stop edge and said fixing wall extends the corresponding lateral wing of the first profile inwards, substantially parallel to the base;
said stop edge comprises first and second stages longitudinally offset relative to each other, the first stage being closer to the base and closer to the stop face than the second stage, and the stop face is capable of abutting against the first stage;
said stop edge comprises first and second stages longitudinally offset relative to each other, the first stage being closer to the base and closer to the stop face than the second stage, and the stop face is capable of abutting against the second stage without interfering with the first stage.

Moreover, a subject of the invention is also a vehicle seat comprising a seat base and at least one runner as defined above, the seat base being secured to the first profile of the runner.

BRIEF DESCRIPTION OF THE DRAWINGS

Other characteristics and advantages of the invention will become apparent during the following description of several of its embodiments, given by way of non-limitative examples, with reference to the attached drawings.

In the drawings:

FIG. 1 is a diagrammatic view of a seat that can be equipped with runners according to the invention, FIG. 2 is a perspective view of one of the runners that can equip the seat in FIG. 1, according to a first embodiment of the invention, this runner comprising a stop insert, FIGS. 19 and 20 are perspective views of two variants of the stop insert.

DETAILED DESCRIPTION OF THE DRAWINGS

Figure 3:
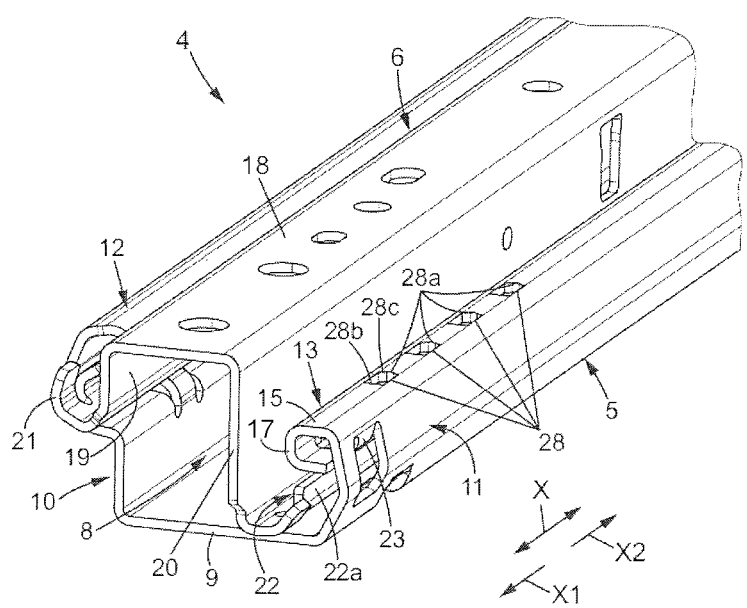
FIG. 3 is a detailed view of the rear portion of the runner in FIG. 2, without the stop insert.

In the different figures, the same references denote identical or similar components.

FIG. 1 shows a seat 1 of a motor vehicle that comprises a seat base 2 mounted on the floor 7 of the vehicle, and a seat back 3 mounted on the seat base 2.

The seat base 2 is connected to the floor 7 by two parallel runners 4, only one of which can be seen in FIG. 1, making it possible to adjust the position of the seat 1 relative to the floor 7 of the vehicle, by sliding in the longitudinal direction X of the runners 4, in a first direction X1 (in this case towards the rear) and in a second opposite direction X2 (in this case towards the front).

As shown in greater detail in FIG. 2, each of the runners 4 comprises first and second profiles 5, 6, made for example of metal, mounted sliding relative to each other in the longitudinal direction X and fitted inside each other, delimiting an inner space 8. In the example considered here, the first profile 5 is a fixed profile secured to the floor 7 of the vehicle and the second profile 6 is a movable profile secured to the base 2 of the seat. In addition, in the example considered here, the first profile 5 is a female profile and the second profile 6 is a male profile fitted inside the female profile.

Figure 7:
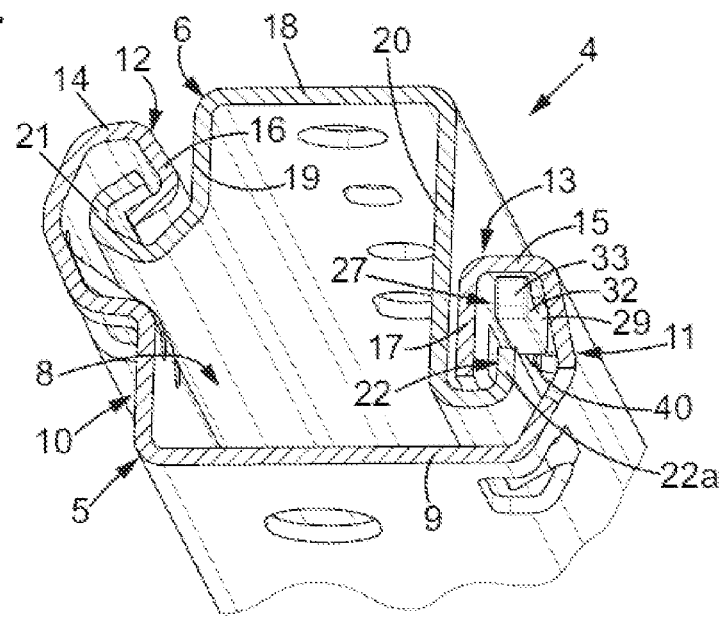
FIG. 7 is a cross section view of the runner in FIG. 2, cut just in front of the stop insert.
Figure 8:
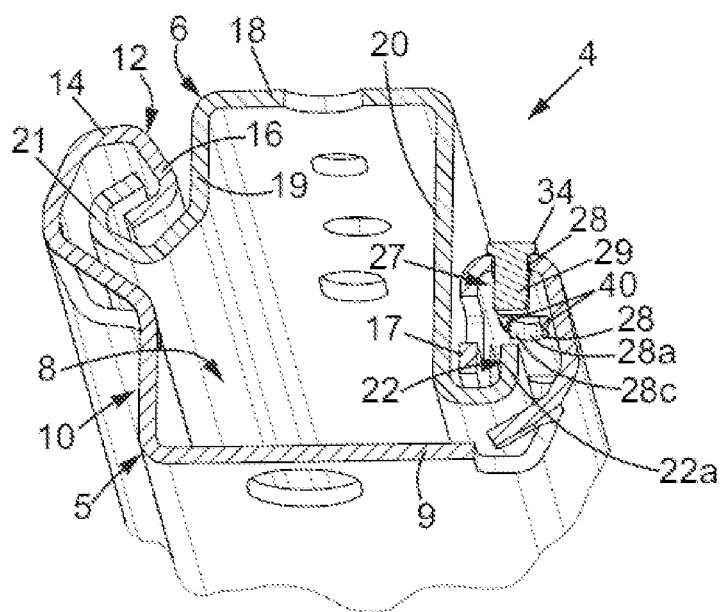
FIG. 8 is a cross section view similar to FIG. 7, cut at the level of the body of the stop insert.

As can be seen in particular in FIGS. 2 and 7, the first and second profiles 5, 6 can have varying shapes. By way of example, the first profile 5 can have a substantially U-shaped section, comprising a horizontal base 9 fixed to the floor 7 of the vehicle, and two lateral wings 10, 11, that each extends substantially vertically upwards from the base 9. Each of these vertical wings 10, 11 can be extended, at its upper end, by a web, respectively 12, 13. Each web 12, 13 comprises a substantially horizontal upper wall 14, 15 that inwardly extends the corresponding lateral wing 10, 11, and a flanged wall 16, 17 that extends the upper wall 14, 15, towards the base 9.

In addition, in the example considered here, the second profile 6 also has a substantially U-shaped cross section, with a substantially horizontal cover wall 18 substantially parallel to the base 9, and two lateral wings 19, 20 extending substantially vertically towards the base 9.

Each of the lateral wings 19, 20 is extended, outwards and in the opposite direction to the base 9, by a flange 21, 22, entering the corresponding web 124, 13.

In a manner known per se, the runner 4 also comprises balls or rollers (not shown) interposed between the two profiles 5, 6 in order to facilitate their relative sliding, and the runner 4 can be controlled either manually by a lock (not shown) that allows for the runner to be selectively locked or unlocked, or by an electric motor controlling the adjustment of the runner by a drive system of the screw and nut mechanism type or other (not shown).

As can be seen in FIG. 2, the first profile 5 comprises fixed stops 23, 24 that are of a piece with said first profile and cooperate by abutment with the second profile 6 in order to limit the travel of said second profile, respectively in the first direction X1 and in the second direction X2.

In the example shown, the fixed stops 23, 24 are each constituted by a lug formed by a lance, respectively 25, 26, arranged in the first profile, this lug being folded inwards in order to interfere with stop edges belonging to the flange 22.

The end-of-travel positions defined by the fixed stops 23, 24 are not necessarily suitable for all vehicles and, in order to make it possible to adapt the end-of-travel position of the runners to the specific needs of each vehicle model, an stop insert 27 is provided on at least one of the two runners 4 of the seat, or on both, in order to define the end-of-travel stop at least in the first direction X1.

The stop insert 27 is fixed in two adjacent openings 28 belonging to a series of openings 28 that are arranged in the first profile and aligned in the longitudinal direction X, as can be seen in FIG. 3. These openings 28 can all be identical and be evenly spaced apart according to a constant pitch p that can be for example of the order of 20 mm. Optionally, the last opening 28 in the second direction X2 can be different from the other openings, as will be explained below. In the example shown, the openings 28 are 4 in number, which makes it possible to choose the position of the stop insert 27 between three positions. Of course, the number of openings 28 can be different from 4, this number being at least equal to 2.

The length of each opening 28 parallel to the longitudinal direction X is relatively small, for example less than 10 mm, such that the presence of the openings 28 does not substantially weaken the structure of the first profile 5. Generally, the openings 28 are arranged in any fixing wall belonging to the first profile 5, and in the first embodiment, this fixing wall is constituted by the upper wall 15 of the web 13 of the first profile.

As shown in FIGS. 4 to 8, the mobile stop 27, which can be produced from a single piece of metal or plastic material, comprises a relatively solid stop body 29, having a section substantially parallelipipedic section, comprising a stop face 30, substantially perpendicular to the longitudinal direction X and oriented in the second direction X2, and an opposite front face 31. Optionally, the body of the stop could be made of metal and the interface with the runner of plastic material.

It will be noted that in the above-mentioned expression "front face" and in the following, the expressions "front edge" and "rear edge" are used in the interests of clarity with reference to the first direction X1, and not with reference to the front and rear of the seat, the stop 27 according to the invention being equally capable of being used in order to define an end-of-travel position in a direction X1 oriented towards the front or the rear of the seat.

The stop body 29 passes through one of the openings 28 called the first opening and is extended, below the front face 31, i.e. in the portion thereof furthest from the upper wall 15, by a nose 32 that extends under the wall 15 in the first direction X1, to a free end that can advantageously form a protrusion 33 towards the inner face of the above-mentioned upper wall 15. The protrusion 33 rests under said inner face of the upper wall 15, or optionally it is separated from said inner face by a small clearance of a few hundredths or tenths of a mm.

In addition, the stop body 29 is topped by a plate that is formed in one piece with said stop body (or optionally made of plastic material overmoulded on the stop body) and that extends horizontally against the outer face of the upper wall 15, longitudinally in the direction X. The plate 34 can project laterally from the stop body 29 and can advantageously comprise moreover a rim 35 extending in the first direction X1 beyond the front face 31 of the stop body. In addition, the plate 34 also extends in the second angular direction X2 from the stop body 29, forming a shank 36 that extends to a rear end equipped with at least one fixing lug 39.

The fixing lug 39 extends downwards and is capable of entering a second opening 28 adjacent to the first opening occupied by the stop body 29 and resting under the upper wall 15. In the example considered here, the lug 39 is a flexible lug that ends in a hook 40 capable of engaging under the upper wall 15 by clipping.

Figure 4:
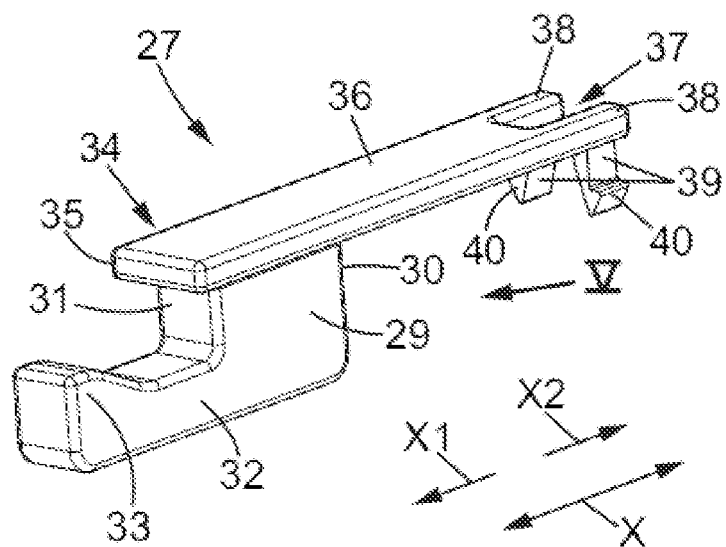
FIGS. 4 and 5 are two perspective views of the stop insert of the runner in FIG. 2, respectively in two opposite directions.
Figure 5:
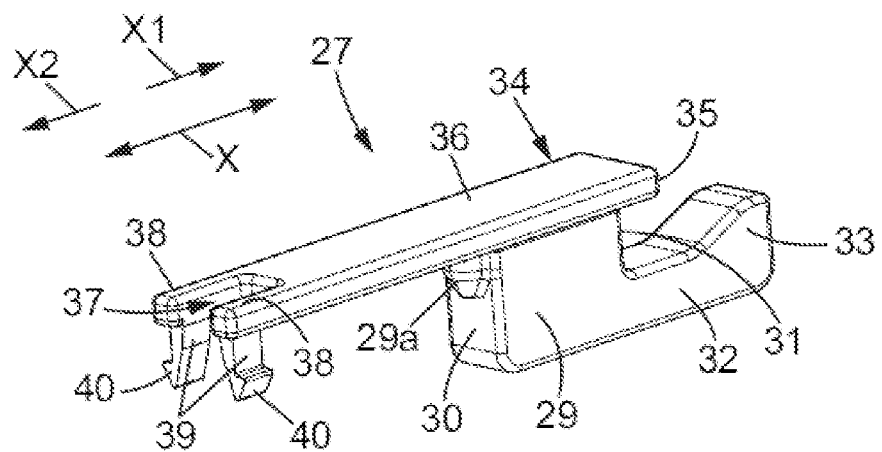

More particularly, as can be seen in FIGS. 4 and 5, the rear end of the shank 36 can optionally comprise a slot 37 parallel to the longitudinal direction X, which delimits two lateral arms 38 at the rear end of which are formed two flexible lugs 39 extending downwards and passing through the second opening 28, each of the flexible lugs 39 ending in a hook 40 that projects laterally outwards, transversally relative to the direction X, in order to clip under the upper wall 15 at the level of the two lateral edges of the second opening 28.

As shown in FIG. 5, the stop body 29 can optionally comprise, on the stop face 30 under the plate 34, a boss 29a that is capable of engaging in a notch 28a (FIG. 3) formed in the rear edge 28c of each opening 28, this boss 29a acting as a locator in order to ensure that the stop 27 is arranged in the correct direction, i.e. with its stop face 30 oriented in the second direction X2.

Figure 6:
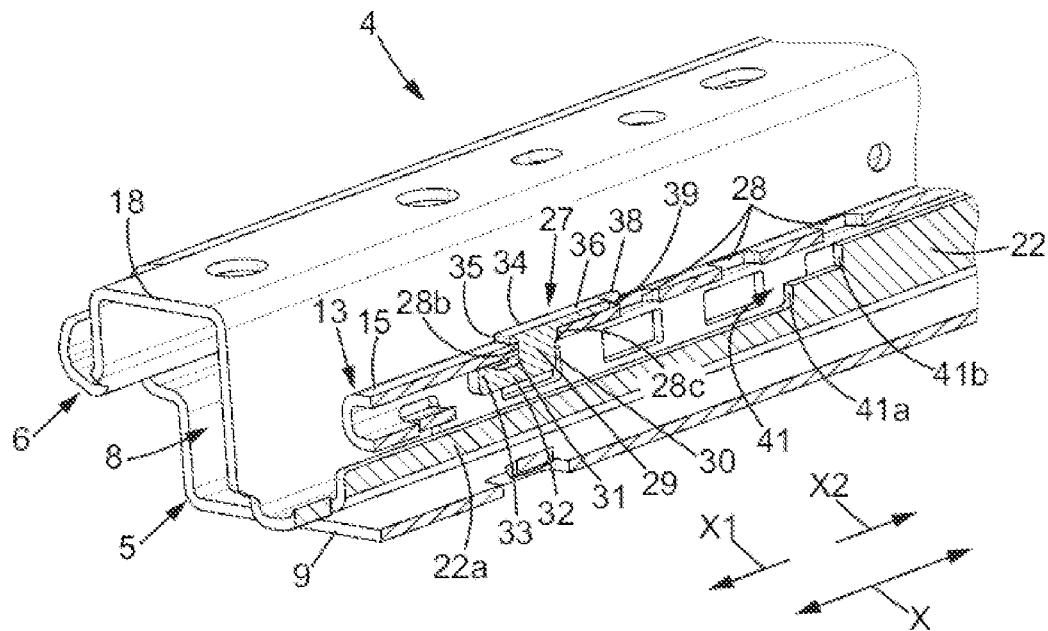
FIG. 6 is a longitudinal vertical cross section view of the runner in FIG. 2.

As shown in FIG. 6, the stop 27 is thus solidly fixed to the first profile 5, since:

the stop body 29 is fitted without play into the first opening 28, the flexible lugs 39 are clipped into the second opening 28, the plate 36 is resting on the upper wall 15, and in particular the rim 35 is resting on the upper wall 15 above the nose 32, and the protrusion 33 of the nose 32 is preferably resting under the inner face of the upper wall 15 optionally a small clearance of a few hundredths to a few tenths of a millimeter can be present between the protrusion 33 and the inner face of the upper wall 15, but in this case, the protrusion 33 remains capable of coming to rest under said inner face of the upper wall 15.

The stop face 30 of the stop 27 is capable of stopping a stop edge 41 belonging to the second profile 6, and more particularly in the example considered, a stop edge belonging to the flange 22 arranged in correspondence with the web 13 on which the stop 27 is fixed.

This stop edge 41 is oriented in the first direction X1 and, from this stop edge 41, the flange 22 extends in the first direction X1 by a portion having a reduced height 22a that does not interfere with the stop insert 27.

In the specific example considered here, the stop edge 41 is staged, and can have for example two stages 41a, 41b, the first stage 41a being lower, i.e. closer to the base 9 and closer to the stop 27 than the second stage 41b, and the two stages 41a, 41b can be separated from each other by a distance smaller than the pitch p of the openings 28, this distance being for example equal to half of the pitch p of the openings 28.

In the example in FIG. 6, the stop body 29 of the stop 27 has a height such that the stop face 30 does not interfere with the first stage 41a, but only with the second stage 41b, so that the end-of-travel position of the second profile 6, in the first direction X1, is determined by contact between the stop face 30 and the second stage 41b of the stop edge 41.

In this stop position, the stop 27 is firmly attached and cannot pivot under the action of the stop edge 41, as it is held on the one hand by the protrusion 33 of the nose 32 resting under the inner face of the upper wall 15, and on the other hand by the plate 34 resting on the outer face of the upper wall 15.

Thus, when the stop edge 41 of the second profile 6 abuts against the stop 27, this stopping results in the stop body 29 essentially being under shear stress. The result is high strength of the stop insert 27 and of its installation, in particular in terms of service life.

Figure 9:
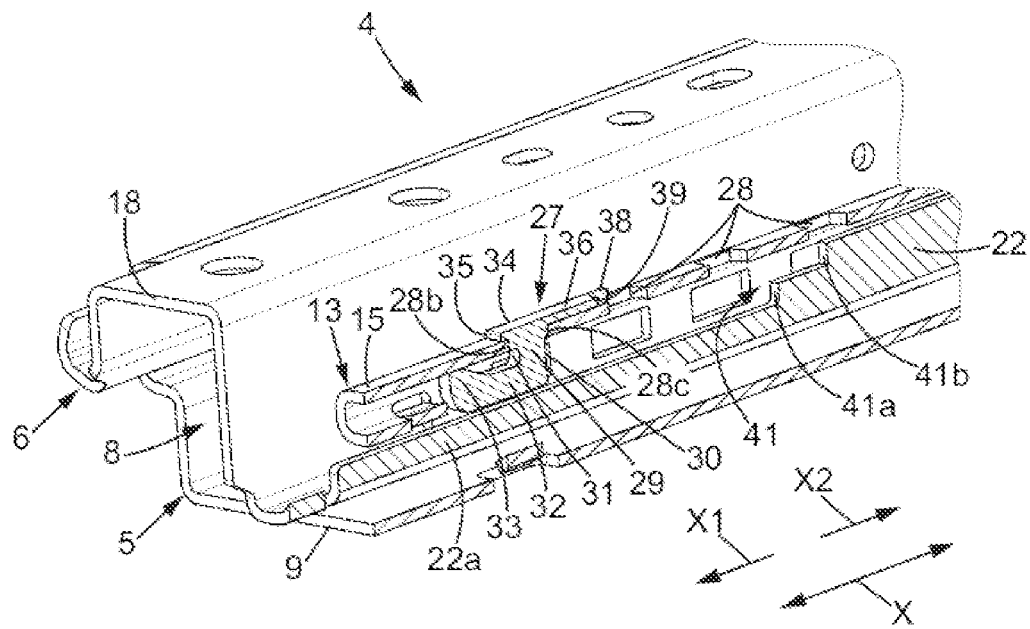
FIG. 9 is a view similar to FIG. 6, showing a variant in which the stop insert is thicker in the vertical direction.

As shown in FIG. 9, the stop 27 can optionally have a higher stop body 29, in which case the stop face 30 is capable of abutting against the first stage 41a of the stop edge 41.

Thus, the use of the stop insert 27 makes it possible for the manufacturer of the runner to configure said runner with a total of 7 possible end-of-travel positions in the first direction X1:

the end-of-travel position determined by the fixed stop 23, three end-of-travel positions determined by the three possible positions of the stop insert 27 in FIGS. 4 to 6, these three positions being separated from each other by the pitch of the openings 28, and three other end-of-travel positions corresponding to the three possible positions of the stop 27 when the stop 27 in FIG. 9 is used with a higher stop body, these three additional positions being offset from the three abovementioned positions, each by a distance p/2.

Of course, it is still possible to use only a single type of stop 27, in which case, a total of 4 possible end-of-travel positions is obtained in the example considered here, and in which case it is possible for the stop edge 41 not to be staged.

Figure 10:
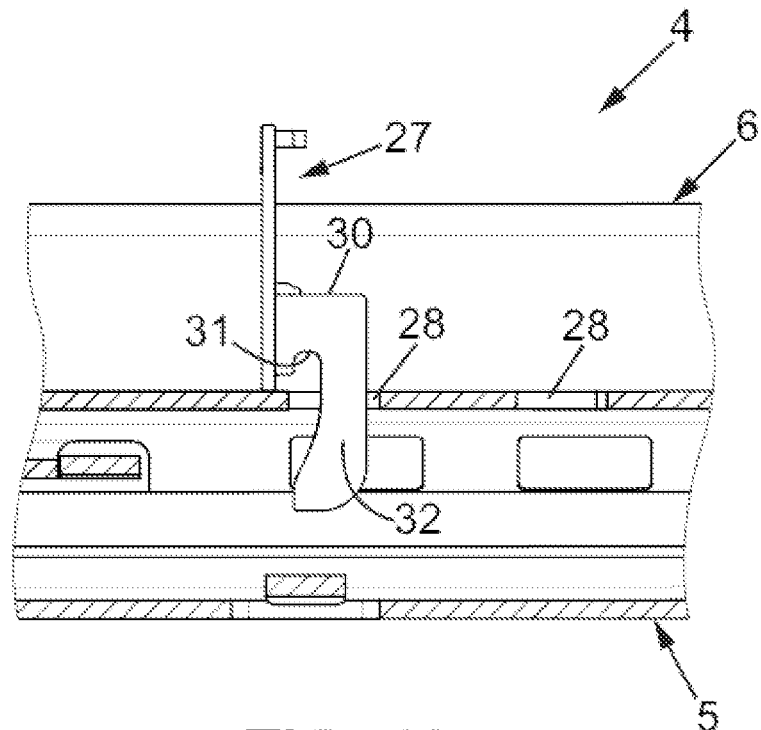
FIGS. 10 and 11 are diagrammatic views illustrating the positioning of the stop insert on the runner, in the variant in FIG. 9.
Figure 11:
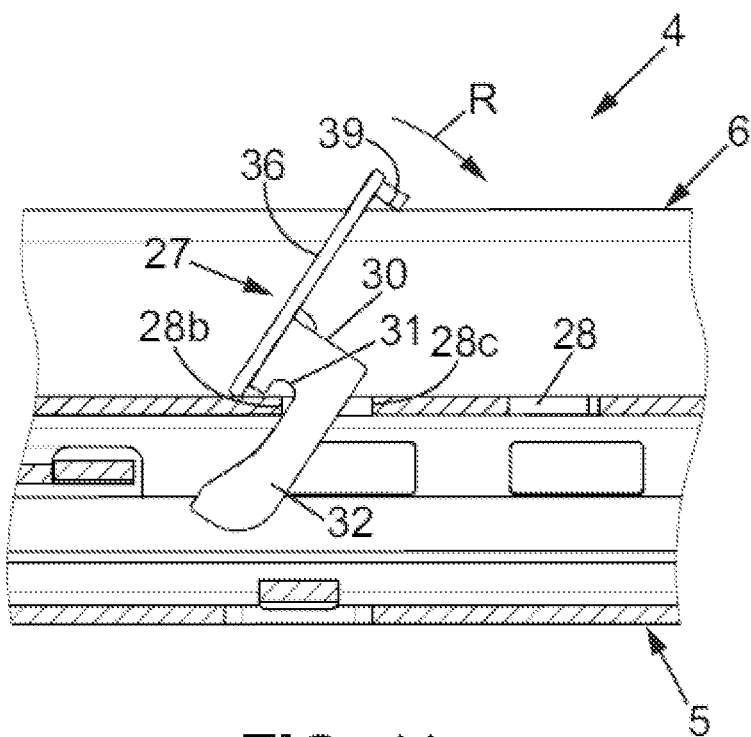
Figure 12:
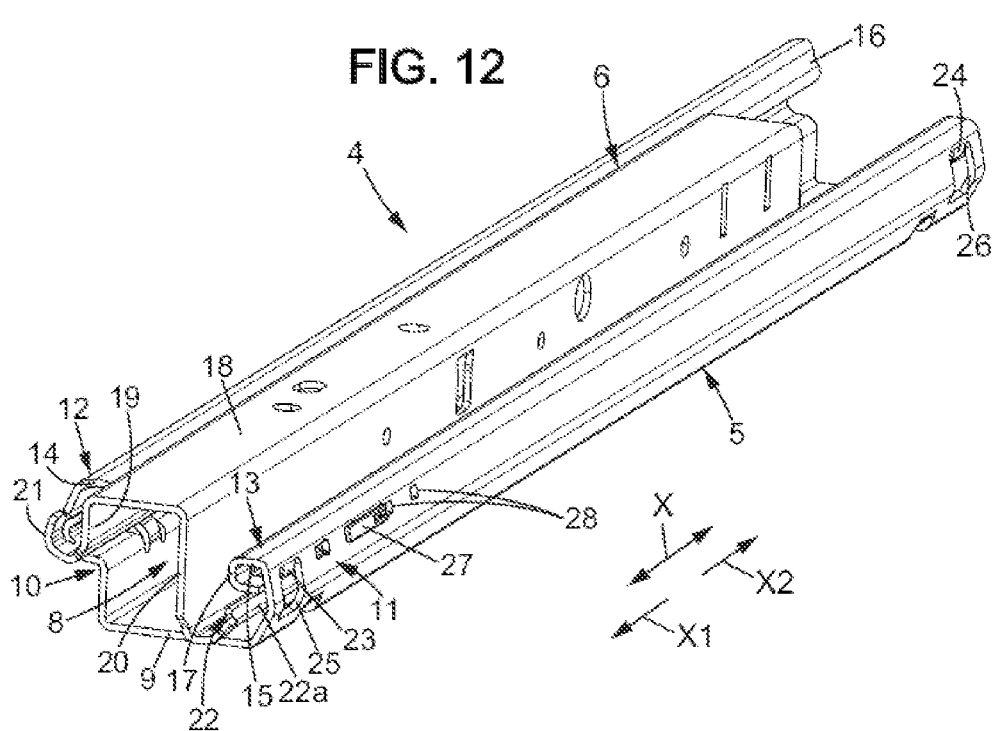
FIG. 12 is a perspective view similar to FIG. 2, for a second embodiment of the invention.
Figure 13:
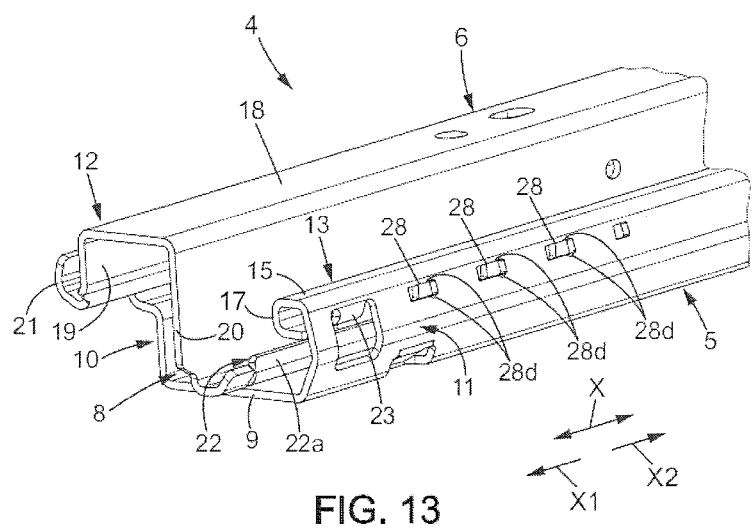
FIG. 13 is a detailed view showing the rear portion of the runner in FIG. 12 without the stop insert.
Figure 14:
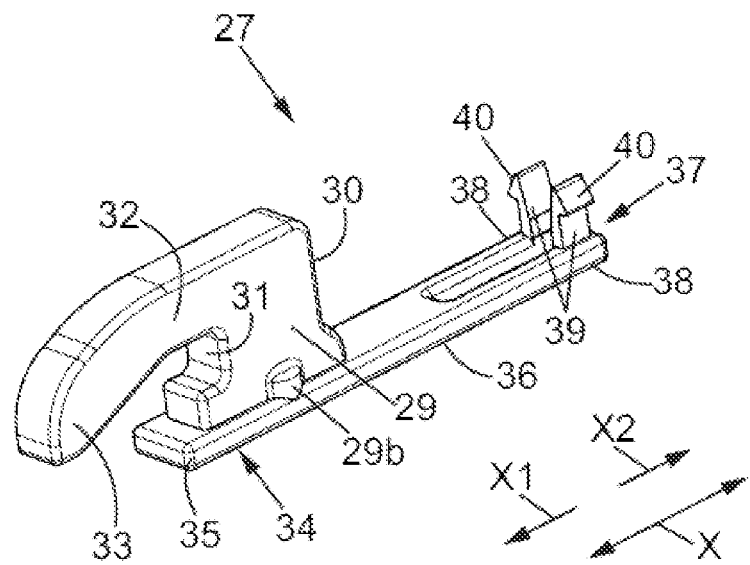
FIGS. 14 and 15 are two perspective views showing the stop insert of the runner in FIG. 12 in two opposite directions.
Figure 15:
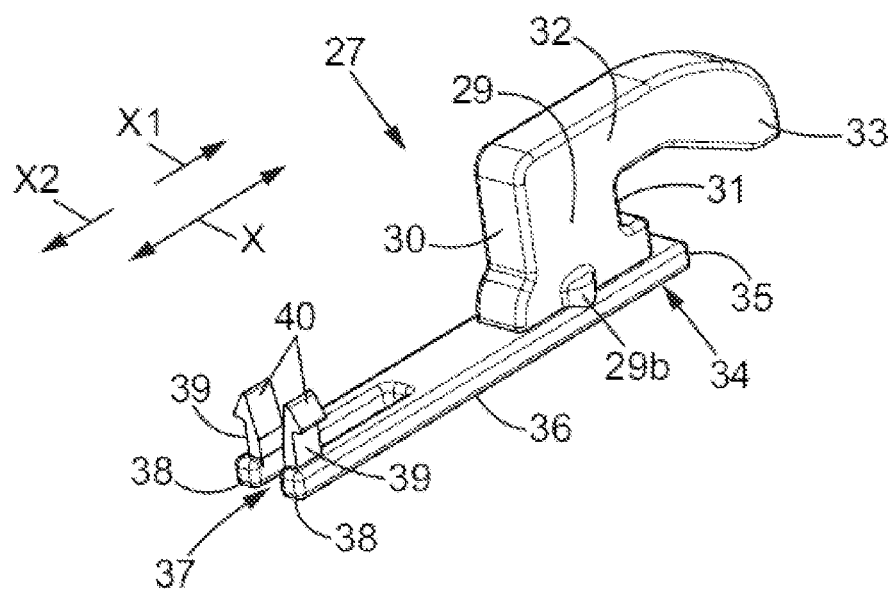
Figure 16:
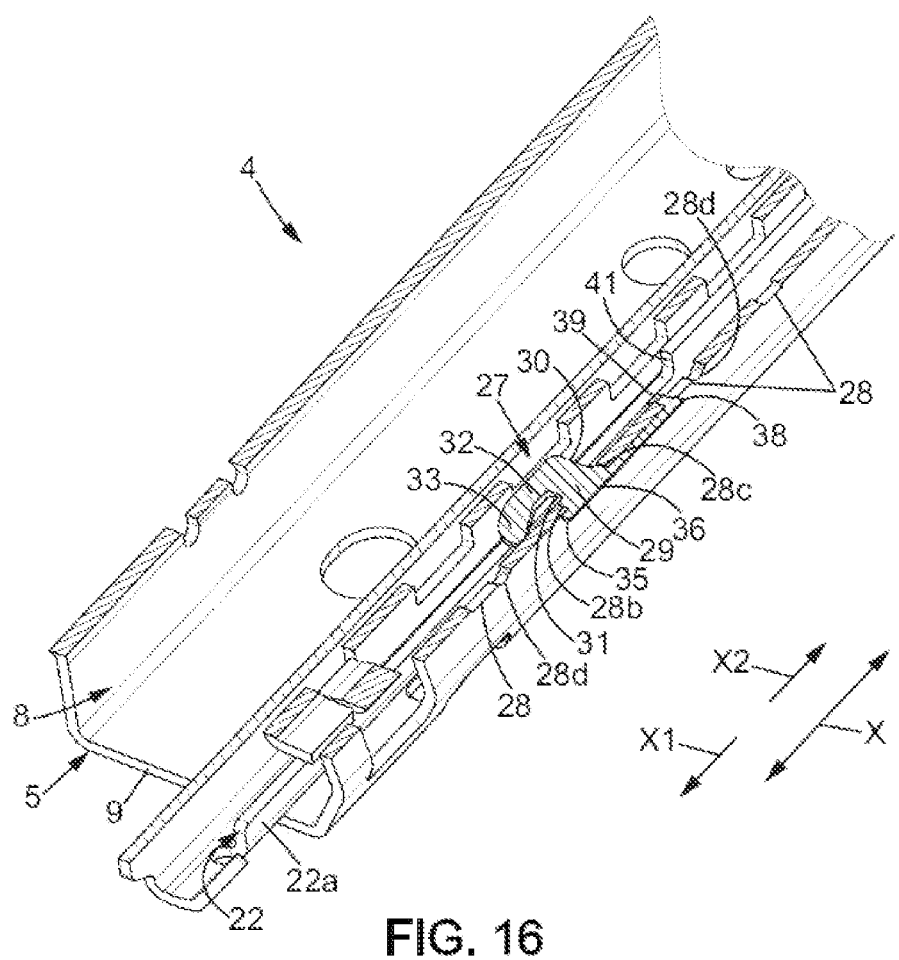
FIG. 16 is a longitudinal horizontal cross section view of the runner in FIG. 12, FIGS. 17 and 18 are two cross section views similar to the above-mentioned FIGS. 7 and 8, in the second embodiment of the invention.
Figure 17:
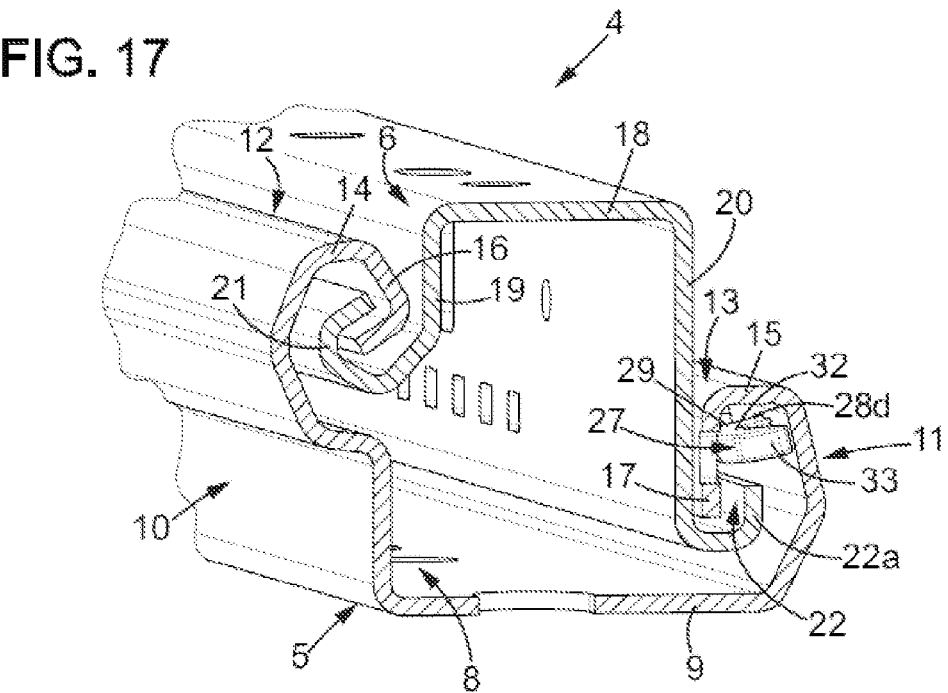
Figure 18:
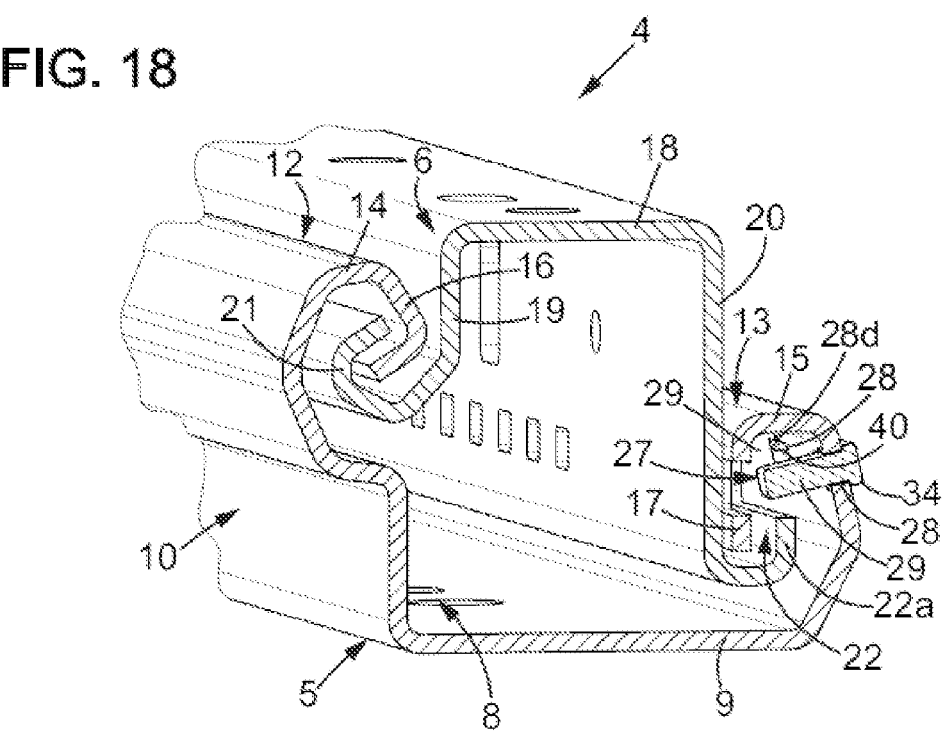

It will be noted that the stop 27 is placed in the first and second openings 28 as follows:

as shown in FIG. 10, firstly the nose 32 of the stop 27 is engaged in the first opening 28, from the outside of the runner, then, as shown in FIG. 11, the front face 31 of the stop body is engaged against the front edge 28b of the first opening 28, and the shank 36 of the stop is folded downwards, pivoting the stop 27 around the front edge 28b of the first opening, in the angular direction R, until the shank 36 of the stop 27 reaches a substantially horizontal position, after which the upper part of the stop body 29 is fitted without play into the first opening 28 and the flexible lugs 39 of the shank 36 of the stop are clipped into the second opening 28.

The stop face 30 of the stop body 29 is shaped in order not to interfere with the rear edge 28c of the first opening 28.

The second embodiment of the invention, which is shown in FIGS. 12 to 18, is similar to the first embodiment and therefore will not be described again in detail. This second embodiment of the invention is essentially distinguished from the first embodiment by the following points:

the openings 28 are arranged not in the upper wall 15 of the web 13 of the first profile, but in the lateral wing 11 of this first profile, so that the stop 27 enters substantially horizontally, or with a slight inclination, into the inner space delimited by the web 13, here, the stop edge 41 forms only a single stage, and this type of configuration is used only with a single type of stop 27, defining a total of four possible end-of-travel positions for the second profile 6 in the first direction X1, in the example considered, where the openings 28 are 4 in number, here, the locator boss 29a of the first embodiment is replaced by two lateral locator bosses 29b projecting laterally from the stop body 29 under the plate 34 and being capable of entering lateral notches 28d in the openings 28, these lateral notches being arranged for example near the front edge 28b or the rear edge 28c of said openings 28 in correspondence with the bosses 29b, here, the last opening 28 in the second direction X2 is shorter than the other openings parallel to the direction X, as this last opening 28 serves only to receive the flexible lugs 39 of the stop 27 when said stop 27 is in its furthest possible position from the free end of the first profile 5 (of course, the last opening 28 could be identical to the other openings, as in the first embodiment described previously, and reciprocally, in said first embodiment, the last opening 28 could be shorter than the others in the direction X, for the same reasons as stated here).

As a variant, in each of the embodiments described previously, the stop 27 could optionally comprise a folding lug 42 (see FIG. 19) extending longitudinally in the slot 37 at the free end of the shank 36. This folding lug is initially in a top position, as shown in FIG. 19, or running on from the shank 36 and said folding lug can be folded down by plastic deformation between the two flexible lugs 39, so as to then prevent said flexible lugs 39 from moving towards each other, which allows for said flexible lugs 39 to be locked once the hooks 40 have been clipped under the fixing wall (15 or 11) in which the openings 28 are formed.

The folding lug 42 can optionally have, at its free end, a spacer 43 wider than said folding lug and coming into contact with the two flexible lugs 39.

According to another variant, shown in FIG. 20, the free end of the shank 36 of the stop 27 could optionally comprise a single fixing lug 39 ending in a hook 40 oriented in the first direction X1 and capable of being clipped under the fixing wall 15 or 11 at the level of the front edge 28b of the second opening 28.

The invention claimed is:

1. A vehicle seat runner comprising:

a first profile and a second profile, said first and second profiles mounted sliding relative to each other in a longitudinal direction, in a first direction and in an opposite second direction, said first and second profiles being fitted inside each other, delimiting an inner space, the first profile having a substantially U-shaped cross section comprising a base and two side portions, each of the side portions having a lateral wing and a web that extends inwards and towards the base from the lateral wing, the second profile being fitted into the first profile and having a substantially U-shaped cross section with a cover wall substantially parallel to the base and two lateral wings extending towards the base and extended outwards and opposite the base by two flanges entering the webs of the first profile, at least one of the side portions of the first profile of the runner comprising a fixing wall that has a series of openings aligned in the longitudinal direction, said fixing wall having an inner face oriented towards the inner space of the runner and an opposite outer face;

an end-of-travel stop made in one part and comprising:

a stop body that is arranged in the inner space of the runner and that has a stop face capable of abutting against a stop edge belonging to one of the flanges of the second profile, the stop body limiting the relative sliding between the first and second profiles in the first direction only, said stop body passing through one of said openings in the fixing wall and extending substantially perpendicular to said fixing wall;

a nose extending from said stop body in the inner space of the runner, in the first direction, said nose being arranged to rest against the inner face of the fixing wall and said nose being adapted to pass through the openings of the fixing wall during mounting of the end-of-travel stop;

a shank that extends from the stop body outside the runner, in the second direction, and that rests against the outer face of the fixing wall, wherein the shank comprises at least one fixing lug that enters another one of said openings in the fixing wall and rests under the inner face of said fixing wall, said another one of said openings being offset from said one of said openings in said second direction, whereas the end-of-travel stop is configured to be fixed to said fixing wall by a slantwise insertion of the nose in said one of said openings and a rotation of the shank until the shank bears on the fixing wall and said at least one fixing lug enters said another one of said openings.

2. The runner according to claim 1, in which the at least one fixing lug is flexible and ends in a hook clipped under the fixing wall.

3. The runner according to claim 2, in which the shank of the end-of-travel stop comprises two flexible fixing lugs ending in hooks oriented in opposite directions to each other transversally relative to the longitudinal direction, said hooks being clipped under the fixing wall.

4. The runner according to claim 3, in which the shank of the stop comprises moreover a folding lug that is configured to be folded down by plastic deformation between the two flexible fixing lugs, said folding lug being capable, when folded down, of preventing the flexible fixing lugs from moving towards each other.

5. The runner according to claim 2, in which the hook on said at least one fixing lug is oriented longitudinally, in the first direction.

6. The runner according to claim 1, in which said one of said openings is delimited in the longitudinal direction by a front edge in the first direction and by a rear edge in the second direction, and the stop body rests against said front edge.

7. The runner according to claim 6, in which the end-of-travel stop has a front rim that extends in the first direction against the outer face of the fixing wall beyond the front edge of said one of said openings.

8. The runner according to claim 1, in which the fixing wall belongs to the lateral wing of the at least one of the side portions of the first profile, corresponding to said stop edge.

9. The runner according to claim 1, in which the fixing wall belongs to the web of the at least one of the side portions corresponding to said stop edge and said fixing wall extends the corresponding lateral wing of the first profile inwards, substantially parallel to the base.

10. The runner according to claim 9, in which said stop edge comprises a first stage and a second stage, the first and second stages longitudinally offset relative to each other, the first stage being closer to the base and closer to the stop face than the second stage, and the stop face is capable of abutting against the first stage.

11. The runner according to claim 9, in which said stop edge comprises a first stage and a second stage, the first and second stages longitudinally offset relative to each other, the first stage being closer to the base and closer to the stop face than the second stage, and the stop face is capable of abutting against the second stage without interfering with the first stage.

12. A vehicle seat comprising a seat base and at least one runner according to claim 1, the seat base being secured to the second profile of the runner.

* * * * *